(12) United States Patent
Park et al.

(10) Patent No.: US 9,954,253 B2
(45) Date of Patent: Apr. 24, 2018

(54) ELECTROLYTE HAVING EUTECTIC MIXTURE AND NITRILE COMPOUND, AND ELECTROCHEMICAL DEVICE CONTAINING THE SAME

(75) Inventors: Ji-Won Park, Daejeon (KR); Byoung-Bae Lee, Chungcheongnam-do (KR); Jae-Seung Oh, Seoul (KR); Dong-Su Kim, Daejeon (KR); Hyo-Jin Lee, Daejeon (KR); Yeon-Suk Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 12/854,505

(22) Filed: Aug. 11, 2010

(65) Prior Publication Data

US 2010/0304222 A1   Dec. 2, 2010

Related U.S. Application Data

(63) Continuation of application No. PCT/KR2010/000169, filed on Jan. 11, 2010.

(30) Foreign Application Priority Data

Jan. 9, 2009   (KR) ........................ 10-2009-0001824

(51) Int. Cl.
*H01M 6/18* (2006.01)
*H01M 6/04* (2006.01)
*H01M 6/16* (2006.01)
*H01G 9/004* (2006.01)
*H01M 10/0569* (2010.01)
*H01M 10/052* (2010.01)
*H01M 10/0567* (2010.01)
*H01G 11/56* (2013.01)

(52) U.S. Cl.
CPC ........ *H01M 10/0569* (2013.01); *H01G 11/56* (2013.01); *H01M 10/052* (2013.01); *H01M 10/0567* (2013.01); *H01M 2300/0025* (2013.01); *Y02E 60/13* (2013.01)

(58) Field of Classification Search
None
See application file for complete search history.

(56) References Cited

U.S. PATENT DOCUMENTS 5,385,794 A * 1/1995 Yokoyama et al. .......... 429/334
6,159,640 A   12/2000 Appel et al.
(Continued)

FOREIGN PATENT DOCUMENTS

CN            1879250 A     12/2006
DE     197 24 709 A1        12/1998
(Continued)

*Primary Examiner* — Barbara L Gilliam
*Assistant Examiner* — Adam A Arciero
(74) *Attorney, Agent, or Firm* — Birch, Stewart, Kolasch & Birch, LLP

(57) ABSTRACT

Disclosed is an electrolyte comprising (a) a eutectic mixture of an amide compound represented by the following chemical formula 1 or 2 and an ionizable lithium salt; and (b) a nitrile compound. The eutectic mixture and the nitrile compound in the electrolyte contribute to excellent thermal and chemical stability and sufficiently low viscosity and high ion conductivity. The electrolyte can be usefully applied as an electrolyte of electrochemical devices.

6 Claims, 1 Drawing Sheet

(56) References Cited

U.S. PATENT DOCUMENTS

| | | | |
|---|---|---|---|
| 6,803,152 B2 * | 10/2004 | Shembel | H01M 6/168 |
| | | | 29/623.1 |
| 2004/0137333 A1 * | 7/2004 | Nishiyama | H01M 4/133 |
| | | | 429/330 |
| 2005/0208371 A1 | 9/2005 | Kim et al. | |
| 2006/0121355 A1 | 6/2006 | Kolosnitsyn et al. | |
| 2006/0204834 A1 * | 9/2006 | Kim et al. | 429/65 |
| 2007/0042266 A1 | 2/2007 | Oh et al. | |
| 2007/0099090 A1 * | 5/2007 | Oh et al. | 429/339 |
| 2010/0021815 A1 * | 1/2010 | Oh et al. | 429/207 |
| 2010/0196766 A1 * | 8/2010 | Park et al. | 429/338 |

FOREIGN PATENT DOCUMENTS

| | | |
|---|---|---|
| JP | 4-94066 | 3/1992 |
| JP | 2000-348759 A | 12/2000 |
| JP | 2000-348760 A | 12/2000 |
| JP | 2001-273936 | 10/2001 |
| JP | 2002-270228 A | 9/2002 |
| JP | 2002-270229 A | 9/2002 |
| JP | 2003-77536 A | 3/2003 |
| JP | 2008-235008 A | 10/2008 |
| KR | 10-2004-0010189 A | 1/2004 |
| KR | 10-2007-0085575 A | 8/2007 |
| KR | 10-0751203 B1 | 8/2007 |
| KR | 10-2008-0011138 A | 1/2008 |
| KR | 10-0804981 B1 | 2/2008 |
| KR | 10-2008-0067574 A | 7/2008 |
| WO | WO 2007/049922 A1 | 5/2007 |
| WO | WO 2008013409 A1 * | 1/2008 |
| WO | WO 2008/127021 A1 | 10/2008 |

* cited by examiner

ELECTROLYTE HAVING EUTECTIC MIXTURE AND NITRILE COMPOUND, AND ELECTROCHEMICAL DEVICE CONTAINING THE SAME

CROSS-REFERENCE TO RELATED APPLICATION

The present application is a continuation of National Phase Application No. PCT/KR2010/000169, filed on Jan. 11, 2010, which claims priority under 35 U.S.C. 119(a) to Korean Patent Application No. 10-2009-0001824 filed on Jan. 9, 2009, the entire content of which is hereby expressly incorporated by reference into the present application.

BACKGROUND OF THE INVENTION

Field of the Invention

The present invention relates to an electrolyte comprising a eutectic mixture and a nitrile compound, and an electrochemical device containing the same.

Description of the Related Art

Various kinds of electrolytes are used for contemporary electrochemical devices, for example, lithium secondary batteries, electrolytic condensers, electric double-layer capacitors, electrochromic display devices, and dye-sensitized solar cells as well that are currently studied in various ways for future commercialization, and the importance on the electrolytes is increased day by day.

In particular, lithium secondary batteries have high energy density and long life cycle, and thus they are the center of attention. Generally, a lithium secondary battery includes an anode made of a carbon material or a lithium metal alloy, a cathode made of lithium metal oxide, and an electrolyte made by dissolving a lithium salt in an organic solvent. Structural stability and capacity of lithium metal oxide are determined by intercalation and disintercalation reactions of lithium ions. The capacity of lithium metal oxide increases as a charge potential is raised, but the lithium metal oxide becomes structurally unstable accordingly. Such unstable structure of the electrode provokes the generation of oxygen, which may cause overheating in a battery or a reaction with the electrolyte, possibly resulting in explosion of the battery.

Currently, an organic solvent used widely for an electrolyte of a lithium secondary battery includes ethylene carbonate, propylene carbonate, dimethoxy ethane, gamma-butyrolactone (GBL), N,N-dimethyl formamide, tetrahydrofurane, acetonitrile, and so on. These organic solvents generally have high volatility and high ignitability, so a lithium secondary battery using such organic solvents may have a problem in its stability, particularly high temperature stability.

In order to solve this problem, it has been suggested to use an imidazolium-based or ammonium-based ionic liquid as an electrolyte of a lithium secondary battery. However, such an ionic liquid may be reduced in an anode at a higher voltage than lithium ions, or imidazolium or ammonium cations may be inserted into the anode together with lithium ions, which rather deteriorates the battery performance.

Meanwhile, Korean Patent Registration No. 10-751203 and Korean Laid-open Patent Publication No. 10-2007-85575 disclose, as an electrolyte, a eutectic mixture of lithium salt and an amide compound such as acetamide, urea, methylurea, caprolactam, valerolactam, trifluoroacetamide, carbamate, formamide, and so on, which is represented by certain chemical formulas. Such a eutectic mixture exhibits high thermal and chemical stability as well as relatively wide electrochemical window, and thus it solves the problems such as evaporation or ignition of an electrolyte caused by use of the existing organic solvents.

Accordingly, the development of various eutectic mixtures as an electrolyte is accelerated. In particular, there is an increased demand for an electrolyte capable of improving the high temperature stability of an electrochemical device.

SUMMARY OF THE INVENTION

Therefore, it is an object of the present invention to provide an electrolyte of a eutectic mixture and a nitrile compound that exhibits high thermal, and chemical stability, and an electrochemical device containing the same.

Another object of the present invention is to provide an electrolyte of a eutectic mixture and a nitrile compound that has sufficiently low viscosity and high ion conductivity and consequently excellent charging/discharging performance, and an electrochemical device containing the same.

To achieve the objects, an electrolyte of the present invention comprises (a) a eutectic mixture of an amide compound represented by the following chemical formula 1 or 2 and an ionizable lithium salt; and (b) a nitrile compound.

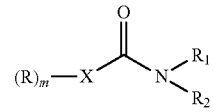

Chemical formula 1 where R, $R_1$ and $R_2$ are hydrogen, halogen or any one selected from the group consisting of alkyl group, alkylamine group, alkenyl group, alkoxy group, alkoxyalkyl group and aryl group, which is unsubstituted or substituted with halogen and has 1 to 20 carbons, independently, and X is any one selected from the group consisting of silicon, oxygen, nitrogen, phosphorus and sulfur, wherein i) m is 1 when X is oxygen or sulfur, ii) m is 2 when X is nitrogen or phosphorus, and iii) m is 3 when X is silicon.

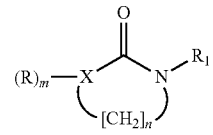

Chemical formula 2 where R and $R_1$ is hydrogen, or any one selected from the group consisting of alkyl group, alkylamine group, alkenyl group, aryl group, alkoxy group, alkoxyalkyl group and allyl group, which is unsubstituted or substituted with halogen and has 1 to 20 carbons, independently, X is any one selected from the group consisting of silicon, oxygen, nitrogen, phosphorus and sulfur, wherein i) m is 0 (zero) when X is oxygen or sulfur, ii) m is 1 when X is nitrogen or phosphorus, and iii) m is 2 when X is silicon, and n is an integer of 1 to 10.

In the electrolyte of the present invention, the amide compound may be methylcarbamate, ethylcarbamate, methyl N-methylcarbamate, ethyl N-methylcarbamate, ethyl N-ethylcarbamate, N-ethyl methylcarbamate, ethyl N,N-dimethylcarbamate, methyl N,N-dimethylcarbamate, N,N-dimethyl phenylcarbamate, N-butyl methylcarbamate, N-phenyl methylcarbamate, N-ethyl-N-phenylethylcarbamate, N-methoxyethylmethylcarbamate, N-methoxyethyl-N-methyl methylcarbamate, N-methoxymethyl-N-methylmethylcarbamate, N,N-dimethyl methoxyethyl carbamate, N-methyl-N-methoxy ethyl methoxyethyl carbamate, N-methyl-N-methoxyethyl methoxymethyl carbamate, N-methoxymethyl-N-methyl ethylcarbamate, N-methoxymethyl-N-ethyl methylcarbamate, N-methoxymethyl-N-methyl trifluoroethylcarbamate, N-methylurea, N,N'-dimethylurea, N-(2-methoxyethyl)-N-methylpiperidine-1-carboxamide, S-phenyl N-2-methoxyethyl-N-methylcarbamothioate, oxazolidinone, N-methyl oxazolidinone, and so on.

In the electrolyte of the present invention, an anion of the lithium salt may be $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3SO_3^-$, $CH_3CO_2^-$, $SCN^-$, $(CF_3CF_2SO_2)_2N^-$, and so on.

In the electrolyte of the present invention, the eutectic mixture preferably includes the amide compound and the lithium salt at a mole ratio of 1:1 to 8:1.

In the electrolyte of the present invention, the nitrile compound may be represented by the following Chemical formula 3.

   Chemical Formula 3 where $R_3$ is any one selected from the group consisting of alkyl group, alkylamine group, alkenyl group, aryl group, alkoxyalkyl group and alkoxy group, which is unsubstituted or substituted with at least one halogen and has 1 to 10 carbons.

The nitrile compound may be acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, methoxyacetonitrile, methoxy propionitrile, ethoxy propionitrile, or mixtures thereof.

The content of the nitrile compound according to the present invention may be 5 to 200 parts by weight based on 100 parts by weight of the eutectic mixture.

Optionally, the electrolyte of the present invention may further comprise a carbonate-based compound. The carbonate-based compound is not limited to a specific type if it is carbonate used typically as an organic solvent of an electrolyte.

And, the electrolyte of the present invention may be a liquid electrolyte, or a solid or gel polymer electrolyte using a polymer. A polymer electrolyte, in particular, a gel polymer electrolyte may be obtained by polymerization of the eutectic compound, the nitrile compound and a precursor solution containing a monomer capable of forming a polymer by the polymerization reaction. Or a polymer electrolyte may be obtained by impregnating the electrolyte of the present invention into a polymer.

The electrolyte of the present invention may be usefully applied to electrochemical devices such as lithium secondary batteries.

EFFECTS OF THE INVENTION

The electrolyte of the present invention gives the following effects.

First, the electrolyte of the present invention exhibits inherent characteristics of a eutectic mixture such as excellent thermal and chemical stability, and allows improvement in high temperature stability of electrochemical devices thanks to a nitrile compound, thereby solving the conventional problems caused by use of an organic solvent, such as evaporation, ignition and side reaction of an electrolyte.

Second, because the eutectic mixture and the nitrile compound in the electrolyte contribute to sufficiently low viscosity and high ion conductivity, the electrolyte of the present invention allows reduction in resistance and improvement in charging/discharging efficiency of electrochemical devices.

DESCRIPTION OF THE PREFERRED EMBODIMENT

Figure 1:
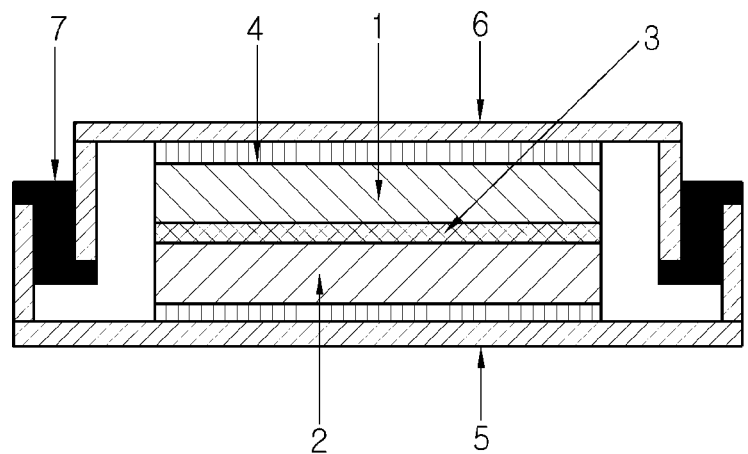
FIG. 1 is a schematic cross-sectional view of a coin-type secondary battery.

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

An electrolyte of the present invention comprises (a) a eutectic mixture of an amide compound represented by the following chemical formula 1 or 2 and an ionizable lithium salt; and (b) a nitrile compound.

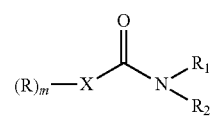

[Chemical Formula 1]

where R, $R_1$ and $R_2$ are hydrogen, halogen or any one selected from the group consisting of alkyl group, alkylamine group, alkenyl group, alkoxy group, alkoxyalkyl group and aryl group, which is unsubstituted or substituted with halogen and has 1 to 20 carbons, independently, and X is any one selected from the group consisting of silicon, oxygen, nitrogen, phosphorus and sulfur, wherein i) m is 1 when X is oxygen or sulfur, ii) m is 2 when X is nitrogen or phosphorus, and iii) m is 3 when X is silicon.

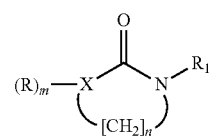

[Chemical Formula 2]

where R and $R_1$ is hydrogen, or any one selected from the group consisting of alkyl group, alkylamine group, alkenyl group, aryl group, alkoxy group, alkoxyalkyl group and allyl group, which is unsubstituted or substituted with halogen and has 1 to 20 carbons, independently, X is any one selected from the group consisting of silicon, oxygen, nitrogen, phosphorus and sulfur, wherein i) m is 0 (zero) when X is oxygen or sulfur, ii) m is 1 when X is nitrogen or phosphorus, and iii) m is 2 when X is silicon, and n is an integer of 1 to 10.

Electrochemical devices generate much heat in use or are frequently exposed to high temperature, so stability at high temperature is a very important factor.

The inventors formed an electrolyte by preparing a eutectic mixture using an amide compound of the above structure and a lithium salt, and adding a nitrile compound to the eutectic mixture. The electrolyte exhibits high thermal and chemical stability that is an intrinsic characteristic of a eutectic mixture, and excellent stability at high temperature as well. And, the inventors found that the nitrile compound in the electrolyte of the present invention forms a thin film on a cathode of an electrochemical device to allow better stability at high temperature. Accordingly, the electrolyte of the present invention comprising a eutectic mixture of an amide compound of the above structure and a lithium salt, and a nitrile compound allows improvement of high temperature stability of secondary batteries, and it may be usefully applied as an electrolyte of secondary batteries having various anode materials.

In the electrolyte of the present invention, the amide compound may be methylcarbamate, ethylcarbamate, methyl N-methylcarbamate, ethyl N-methylcarbamate, ethyl N-ethylcarbamate, N-ethyl methylcarbamate, ethyl N,N-dimethylcarbamate, methyl N,N-dimethylcarbamate, N,N-dimethyl phenylcarbamate, N-butyl methylcarbamate, N-phenyl methylcarbamate, N-ethyl-N-phenylethylcarbamate, N-methoxyethylmethylcarbamate, N-methoxyethyl-N-methyl methylcarbamate, N-methoxymethyl-N-methylmethylcarbamate, N,N-dimethyl methoxyethyl carbamate, N-methyl-N-methoxyethyl methoxyethyl carbamate, N-methyl-N-methoxyethyl methoxymethyl carbamate, N-methoxymethyl-N-methyl ethylcarbamate, N-methoxymethyl-N-ethyl methylcarbamate, N-methoxymethyl-N-methyl trifluoroethylcarbamate, N-methylurea, N,N'-dimethylurea, N-(2-methoxyethyl)-N-methylpiperidine-1-carboxamide, S-phenyl N-2-methoxyethyl-N-methylcarbamothioate, oxazolidinone, N-methyl oxazolidinone, and so on.

In the electrolyte of the present invention, the lithium salt used with the amide compound is an ionizable lithium salt and expressed by $Li^+X^-$. An anode of the lithium salt may be $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6PF^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3SO_3^-$, $CH_3CO_2^-$, $SCN^-$, $(CF_3CF_2SO_2)_2N^-$, and so on, however the present invention is not limited in this regard.

The eutectic mixture in the electrolyte of the present invention has a melt temperature that may vary depending on R, $R_1$, $R_2$ and X of the chemical formula 1 or 2, but preferably the eutectic mixture exists in a liquid state at room temperature (25° C.).

Meanwhile, the electrolyte of the present invention comprises a nitrile compound.

In the nitrile compound, a nitrile group of a strong polarity is strongly bonded to the surface of a cathode at a high temperature to form a complex. The complex functions as a protection film for protecting an active area of the surface of the cathode. Thus, it can prevent a phenomenon that a portion of a transition metal is ejected and deposited at the anode during charge/discharge, and suppress a side reaction between the electrolyte and the cathode or gas generation, thereby improving high temperature performance characteristics.

Ion conductivity is generally determined according to the degree of mobility of ions moving in an electrolyte solution, and thus viscosity of the electrolyte solution and ion concentration in the electrolyte solution are factors affecting on the ion conductivity. As viscosity of the electrolyte solution is lower, ions may more freely move in the electrolyte solution, and ion conductivity increases. As ion concentration is higher in the electrolyte solution, an amount of ions serving as charge carriers increases and consequently the ion conductivity increases. Because the electrolyte of the present invention is a mixture of a eutectic mixture and a nitrile compound, it has a low viscosity and the improved ion conductivity. In this point of view, viscosity of the electrolyte is preferably 100 cP or lower, more preferably 5 to 20 cP in consideration of ion conductivity and thermal stability. In the same point of view, a preferable ion conductivity of the electrolyte is 5 to 10 mS/cm.

Preferably, the content of the nitrile compound is 5 to 200 parts by weight based on 100 parts by weight of the eutectic mixture to improve performance at high temperature and ion conductivity.

The nitrile compound included in the electrolyte of the present invention may use any nitrile compound that can be typically used in non-aqueous electrolytes of lithium secondary batteries, for example, a nitrile compound represented by the following chemical formula 3.

  [Chemical Formula 3]

where $R_3$ is any one selected from the group consisting of alkyl group, alkylamine group, alkenyl group, aryl group, alkoxyalkyl group and alkoxy group, which is unsubstituted or substituted with at least one halogen and has 1 to 10 carbons, and preferably is an alkoxyalkyl group or an alkoxy group, which is unsubstituted or substituted with at least one fluorine atom and has 1 to 10 carbons.

The nitrile compound may be acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, methoxyacetonitrile, methoxy propionitrile, ethoxy propionitrile, or mixtures thereof, however the present invention is not limited in this regard.

Optionally, the electrolyte of the present invention may further comprise a carbonate-based compound according to necessity. The carbonate-based compound usable in the electrolyte of the present invention is not limited to a specific type if it is a carbonate-based compound used typically to a nonaqueous electrolyte solution of secondary batteries, for example a linear carbonate-based compound, a cyclic carbonate-based compound or mixtures thereof. Such a carbonate-based compound may be propylene carbonate (PC), ethylene carbonate (EC), diethyl carbonate (DEC), dimethyl carbonate (DMC), dipropyl carbonate (DPC), butylene carbonate, methylpropyl carbonate, ethylpropyl carbonate, dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL), and so on, however the present invention is not limited in this regard. Such carbonate-based compounds may be substituted with halogen atoms, as mentioned above.

It is obvious to an ordinary person skilled in the art that the electrolyte of the present invention may further comprise various kinds of additives or organic solvents, without departing from the scope of the invention.

The electrolyte of the present invention may be prepared in a typical way well known in the art. For example, the electrolyte may be made by mixing an amide compound with a lithium salt to prepare a euctectic mixture, and adding a nitrile compound to the euctectic mixture, or by mixing an amide compound, a nitrile compound and a lithium salt at room temperature and applying a proper temperature of 70° C. or lower to effect a reaction, followed by purification.

At this time, the eutectic mixture includes the amide compound and the lithium salt at a mole ratio of preferably 1:1 to 8:1, more preferably 2:1 to 6:1 to ensure a suitable ion conductivity for using an electrolyte and for forming a eutectic mixture.

The electrolyte of the present invention can be made in various types. For example, the electrolyte of the present invention may be a liquid electrolyte, or a solid or gel polymer electrolyte suing a polymer. If the electrolyte of the present invention is a liquid electrolyte, the electrolyte comprising the eutectic mixture and the nitrile compound may be used singularly or in mixture with salts, organic solvents, additives and so on. Meanwhile, the electrolyte of the present invention may be a polymer electrolyte, in particular, a gel polymer electrolyte obtained by polymerization of the electrolyte comprising the eutectic mixture and the nitrile compound, and a precursor solution containing a monomer that forms a polymer by the polymerization reaction. Or the electrolyte of the present invention may be a polymer electrolyte obtained by impregnating the electrolyte comprising the eutectic mixture and the nitrile compound into a polymer.

First, described is a gel polymer electrolyte made by a polymerization reaction of a precursor solution.

According to an aspect of the present invention, a gel polymer electrolyte may be made by polymerizing (i) the electrolyte comprising the eutectic mixture and the nitrile compound; and (ii) a precursor solution containing a monomer capable of forming a polymer by the polymerization reaction.

In the polymerization reaction, all kinds of monomers may be applied that can form a gel polymer together with the eutectic mixture and the nitrile compound. For example, a vinyl monomer may be used, however the present invention is not limited in this regard. The vinyl monomer has an advantage of very simple polymerization when it is mixed with the eutectic mixture and the nitrile compound to form a gel polymer.

Available vinyl monomers may be, for example, acrylonitrile, methylmethacrylate, methylacrylate, methacrylonitrile, methylstyrene, vinylester, vinyl chloride, vinylidene chloride, acrylamide, tetrafluoroethylene, vinylacetate, methylvinylketone, ethylene, styrene, para-methoxystyrene and para-cyanostyrene, or mixtures thereof, however the present invention is not limited in this regard.

The precursor solution may additionally contain a typical polymerization initiator or photo initiator. The initiator is decomposed by heat or UV rays to form radicals and reacts with the monomer, which is referred to as a free radical polymerization, to form a gel polymer electrolyte. And, the initiator may not be used in polymerization with the monomer. Generally, the free radical polymerization goes through an initiation step where temporary molecules of strong reactivity or an active site is formed, a propagation step where a monomer is added to an end of a chain in the active site to form a new active site at the end of the chain, a transfer step where the active site is transferred to the other molecules, and a chain termination step where the active center is destroyed.

Available thermal polymerization initiators may be, for example, organic peroxides or hydroperoxides such as benzoyl peroxide, acetyl peroxide, dilauryl peroxide, di-tert-butyl peroxide, cumyl hydroperoxide and hydrogen peroxide; azo compounds such as 2,2-azobis(2-cyanobutane), 2,2-azobis(methylbutyronitrile), AIBN (azobis(iso-butyronitrile) and AMVN (azobisdimethyl-valeronitrile); organic metals such as alkylated silvers; and so on, however the present invention is not limited in this regard. The photo initiator that forms radicals by light such as UV rays may be, for example, chloroacetophenone, diethoxy acetophenone (DEAP), 1-phenyl-2-hydroxy-2-methyl propaneone (HMPP), 1-hydroxy cyclohexyl phenyl ketone, α-amino acetophenone, benzoin ether, benzyl dimethyl ketal, benzophenone, thioxanthone, 2-ethylanthraquinone (2-ETAQ), and so on.

In addition to the above components, the precursor solution of the gel polymer electrolyte according to the present invention may selectively contain additives well known in the art.

The gel polymer electrolyte is made using the precursor solution in a typical way well known in the art. At this time, the gel polymer electrolyte is preferably made by in-situ polymerization reaction in an electrochemical device. The in-situ polymerization reaction may be conducted using heat or UV irradiation. A weight ratio of the electrolyte of the eutectic mixture and the nitrile compound to the monomer if the precursor solution is preferably controlled to 0.5~0.95: 0.05~0.5, which ensures a suitable viscosity for use as a gel electrolyte.

The degree of polymerization of the gel polymer may be adjusted depending on reaction factors such as polymerization time, polymerization temperature and an amount of irradiated light, so the degree of polymerization is controlled so that an electrolyte does not leak and volume of a polymer does not shrink due to over-polymerization.

According to another aspect of the present invention, a polymer electrolyte is made by injecting the electrolyte comprising the eutectic mixture and the nitrile compound into a previously prepared solid or gel polymer such that the electrolyte is impregnated in the polymer.

Available polymers may be, for example, polymethylmethacrylate, polyvinylidene difluoride, polyvinyl chloride, polyethylene oxide, polyhydroxyethylmethacrylate or mixtures thereof, however the present invention is not limited in this regard. This process is simpler than the above-mentioned process using in-situ polymerization.

According to still another aspect of the present invention, a polymer electrolyte is made by dissolving a polymer and the electrolyte comprising the eutectic mixture and the nitrile compound in a solvent and eliminating the solvent. At this time, the eutectic mixture and the nitrile compound are in a state of impregnation in a polymer matrix.

Available solvents are not specially limited, but may be for example toluene, acetone, acetonitrile, THF and so on. And, the solvent may be eliminated in various ways such as heating, without special limitations.

The electrolyte of the present invention may be applied to typical electrochemical devices well known in the art that require various electrochemical characteristics, according to the purpose of use.

The electrochemical devices may be, for example, primary batteries, secondary batteries, fuel cells, solar cells, electrochromic display devices, electrolytic condensers or capacitors, and so on, however the present invention is not limited in this regard.

Specifically, a lithium secondary battery using the electrolyte of the present invention has good thermal stability. Accordingly, after a pouch-type secondary battery using the electrolyte of the present invention was charged to 4.2V, and left alone at 90° C. for 4 hours, the battery has a thickness variability of 10% or less, preferably 5% or less.

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

1. Preparation of Electrolyte

Example 1

4.2 g of methylcarbamate and 4 g of LiTFSI were put into a round bottom flask, slowly stirred for 2 hours under a nitrogen atmosphere, and added with 1.7 g of valeronitrile, thereby obtaining 9.9 g of a desired electrolyte.

Example 2

4.2 g of methylcarbamate and 4 g of LiTFSI were put into a round bottom flask, slowly stirred for 2 hours under a nitrogen atmosphere, and added with 1.7 g of butyronitrile, thereby obtaining 9.9 g of a desired electrolyte.

Example 3

5.2 g of N,N-dimethyl methylcarbamate and 2 g of $LiPF_6$ were put into a round bottom flask, slowly stirred for 2 hours under a nitrogen atmosphere, and added with 2.3 g of valeronitrile, thereby obtaining 9.5 g of a desired electrolyte.

Example 4

5.3 g of N-methyl oxazolidinone and 2 g of $LiPF_6$ were put into a round bottom flask, slowly stirred for 2 hours under a nitrogen atmosphere, and added with 2.4 g of valeronitrile, thereby obtaining 9.7 g of a desired electrolyte.

Example 5

6.4 g of N-methoxymethyl-N-methyl trifluoroethylcarbamate and 2 g of $LiPF_6$ were put into a round bottom flask, slowly stirred for 2 hours under a nitrogen atmosphere, and added with 2.6 g of ethoxy propionitrile, thereby obtaining 11 g of a desired electrolyte.

Example 6

3.6 g of N-methoxymethyl methylcarbamate and 2 g of $LiPF_6$ were put into a round bottom flask, slowly stirred for 2 hours under a nitrogen atmosphere, and added with 2.6 g of ethoxy propionitrile, thereby obtaining 8.2 g of a desired electrolyte.

Example 7

3.8 g of S-phenyl N-2-methoxyethyl-N-methylcarbamothioate and 2 g of $LiPF_6$ were put into a round bottom flask, slowly stirred for 2 hours under a nitrogen atmosphere, and added with 2.6 g of ethoxy propionitrile, thereby obtaining 8.4 g of a desired electrolyte.

Example 8

4.2 g of N-(2-methoxyethyl)-N-methylpiperidine-1-carboxamide and 2 g of $LiPF_6$ were put into a round bottom flask, slowly stirred for 2 hours under a nitrogen atmosphere, and added with 2.6 g of ethoxy propionitrile, thereby obtaining 8.8 g of a desired electrolyte.

Comparative Example 1

4.2 g of purified methylcarbamate and 4 g of LiTFSI were put into a round bottom flask and slowly stirred for 2 hours at a room temperature under a nitrogen atmosphere, thereby obtaining 8.2 g of a eutectic mixture.

Comparative Example 2

5.2 g of N,N-dimethyl methylcarbamate and 2 g of $LiPF_6$ were put into a round bottom flask and slowly stirred for 2 hours under a nitrogen atmosphere, thereby obtaining 7.2 g of a eutectic mixture.

Comparative Example 3

4.2 g of ethylene carbonate and 6.3 g of ethylmethyl carbonate were mixed, and 1.5 g of $LiPF_6$ was dissolved in the mixture, so that 1M concentration of an electrolyte was obtained.

Experimental Example 1: Evaluation of Properties of Electrolyte

The electrolytes made according to the above examples and comparative examples were tested for properties evaluation.

The electrolytes made according to the example 1 and the comparative examples 1 and 2 were used as samples. Viscosity was measured at 25° C. using a RS150 viscometer, and ion conductivity was measured using Inolab 740. The test results are shown in the following table 1.

TABLE 1

| | Viscosity (cP) | Ion conductivity (mS/cm) |
|---|---|---|
| Example 1 | 8.6 | 5.5 |
| Example 3 | 6.3 | 6.1 |
| Example 5 | 7.4 | 5.3 |
| Example 6 | 7.6 | 5.8 |
| Comparative example 1 | 62.0 | 1.7 |
| Comparative example 2 | 35.0 | 1.3 |

As shown in the table 1, it was found that the electrolyte of the present invention exhibits the improved viscosity and ion conductivity.

2. Manufacture of Secondary Battery

Example 9

Formation of Cathode $LiCoO_2$ as a cathode active material, artificial graphite as a conductive material, and polyvinylidene fluoride as a binder were mixed at a weight ratio of 94:3:3, and N-methylpyrrolidone was added to the obtained mixture to prepare a slurry. The prepared slurry was applied to an aluminum foil and dried at 130° C. for 2 hours, thereby making a cathode.

Formation of Anode

An anode active material, artificial graphite as conductive material and a binder were mixed at a weight ratio of 94:3:3, and N-methylpyrrolidone was added to the obtained mixture to prepare a slurry. The prepared slurry was applied to a copper foil and dried at 130° C. for 2 hours, thereby making an anode.

Assembly of Secondary Battery

The cathode and the anode were prepared at a size of 1 cm$^2$, and a separator was interposed between them. The electrolyte made according to the example 3 was injected thereto, thereby manufacturing a secondary battery as shown in FIG. 1. In FIG. 1, reference numeral 1 designates a cathode, reference numeral 2 designates an anode, reference numeral 3 designates a separator and an electrolyte, reference numeral 4 designates a spacer, reference numeral 5 designates a coin can container, reference numeral 6 designates a coin can cover, and reference numeral 7 designates a seaming rubber.

Comparative Example 4

A secondary battery was manufactured in the same way as the example 9 except that the electrolyte of the comparative example 3 was used instead of the electrolyte of the example 3.

Evaluation of Charging/Discharging Performance

Each of the secondary batteries manufactured as mentioned above was charged/discharged at 0.5 mAcm$^2$, and discharge capacity and charging/discharging efficiency were measured according to cycles.

Figure 2:
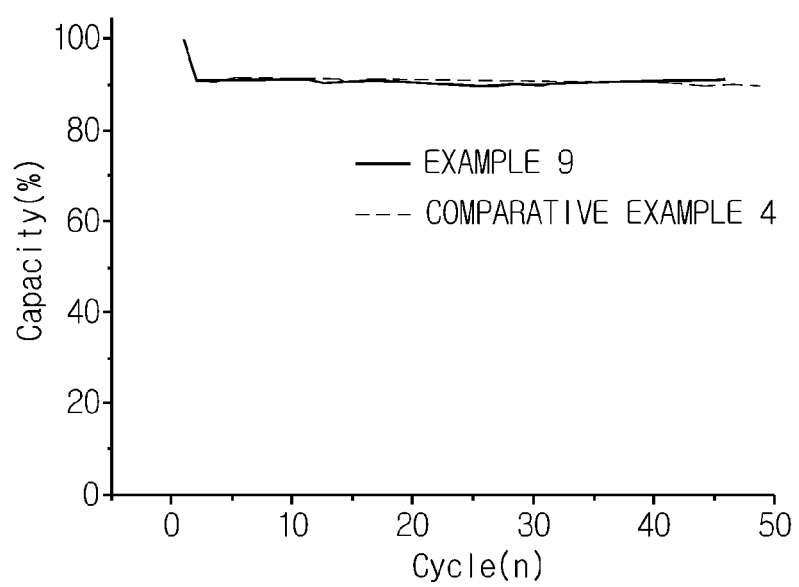
FIG. 2 is a graph showing discharge capacity of secondary batteries comprising electrolytes of example 9 and comparative example 4.

As a result of the experiment, it was found that both of the battery of the comparative example 4 using the electrolyte containing a typical carbonate-based solvent and the battery of the example 9 using the electrolyte of the present invention containing a eutectic mixture exhibit 85% or more of discharge capacity and 99% of charging/discharging efficiency after the fifth cycle. In FIG. 2, a solid line indicates the example 9, and a dotted line indicates the comparative example 4. It was found from these results that the electrolyte of the present invention containing a eutectic mixture can give performance equivalent to conventional commercialized liquid electrolytes.

Example 10

2.3 g of the electrolyte made according to the example 3 was injected into a commercial polymer battery to manufacture a pouch-type secondary battery.

Comparative Example 5

2.3 g of the electrolyte made according to the comparative example 2 was injected into a commercial polymer battery to manufacture a pouch-type secondary battery.

High Temperature Stability Test of Secondary Battery

The pouch-type secondary batteries manufactured according to the example 10 and the comparative example 5 were charged to 4.2V and left alone at 90° C. for 4 hours, and thickness variability of the batteries was measured. The experimental results are shown in the following table 5.

TABLE 2

| | Initial Thickness (mm) | Second Thickness (mm) | Increment (%) |
|---|---|---|---|
| Example 10 | 3.87 | 3.98 | 2.8% |
| Comparative Example 5 | 3.86 | 4.32 | 11.9% |

Seeing the table 2, it was found that the battery of the example 10 using the electrolyte of the present invention comprising a nitrile compound exhibits smaller thickness variability and consequently better stability at high temperature than the battery of the comparative example 5 using a conventional electrolyte comprising a eutectic mixture.

What is claimed is:

1. An electrochemical device comprising a cathode, an anode and a non-aqueous electrolyte solution,
   wherein the anode is made of a carbon material,
   wherein the non-aqueous electrolyte solution comprises:
   (a) a eutectic mixture of an amide compound and an ionizable lithium salt; and
   (b) a nitrile compound which is ethoxy propionitrile;
   wherein the non-aqueous electrolyte solution has a viscosity of 7.4 cP to 7.6 cP at 25° C. and is free of carbonate compounds,
   wherein the non-aqueous electrolyte solution has an ion conductivity of 5.3 mS/cm to 5.8 mS/cm,
   wherein the content of the nitrile compound is 31.5 to 200 parts by weight based on 100 parts by weight of the eutectic mixture, and
   wherein the amide compound is selected from N-methoxymethyl methylcarbamate or N-methoxymethyl-N-methyl trifluoroethylcarbamate.

2. The electrochemical device according to claim 1,
   wherein an anion of the lithium salt is any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3SO_3^-$, $CH_3CO_2^-$, $SCN^-$ and $(CF_3CF_2SO_2)_2N^-$.

3. The electrochemical device according to claim 1,
   wherein the eutectic mixture includes the amide compound and the lithium salt at a mole ratio of 1:1 to 8:1.

4. The electrochemical device according to claim 1,
   wherein the electrochemical device is a lithium secondary battery.

5. The electrochemical device according to claim 4,
   wherein the lithium secondary battery is a pouch-type secondary battery, and
   wherein the pouch-type secondary battery has a thickness variability of 10% or less after the battery is charged to 4.2V and left alone at 90° C. for 4 hours.

6. The electrochemical device according to claim 1,
   wherein the non-aqueous electrolyte solution is a liquid electrolyte.

* * * * *